(12) United States Patent
Panzarella et al.

(10) Patent No.: US 6,692,215 B1
(45) Date of Patent: Feb. 17, 2004

(54) LIFT AND CARRIER ASSEMBLY FOR A PERSONAL-TRANSPORT VEHICLE

(75) Inventors: Thomas A. Panzarella, Blue Bell, PA (US); James B. Eldon, III, Barto, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 0 days.

(21) Appl. No.: 10/077,535

(22) Filed: Feb. 15, 2002

Related U.S. Application Data
(60) Provisional application No. 60/278,621, filed on Mar. 26, 2001.

(51) Int. Cl.[7] .................................................. B60P 9/00
(52) U.S. Cl. ........................................ 414/462; 414/921
(58) Field of Search ................................ 414/462, 648, 414/545, 921

(56) References Cited

U.S. PATENT DOCUMENTS

| | | | |
|---|---|---|---|
| 5,011,361 A | * 4/1991 | Peterson | 414/462 |
| 5,567,107 A | 10/1996 | Bruno et al. | 414/462 |
| 2001/0026755 A1 | 10/2001 | Mortimore | 414/556 |

* cited by examiner

Primary Examiner—Donald W. Underwood
(74) Attorney, Agent, or Firm—Woodcock Washburn LLP

(57) ABSTRACT

A presently-preferred embodiment of a lift and carrier assembly for a personal-transport vehicle comprises a lifting column, an actuator mechanism adapted to lift the lifting column, a pivot plate rotatably coupled to the lifting column, a platform fixedly coupled to the pivot plate, a cam follower coupled to the pivot plate, and a cam member being fixed in relation to the lifting column so that lifting of the lifting column causes the cam follower to contact the cam member thereby generating a contact force between the cam follower and the cam member. The cam follower is biased so that the contact force prevents the cam follower from being lifted when a weight acting on the platform is below a predetermined value thereby causing the pivot plate to rotate about the lifting column in response to the lifting of the lifting column.

38 Claims, 14 Drawing Sheets

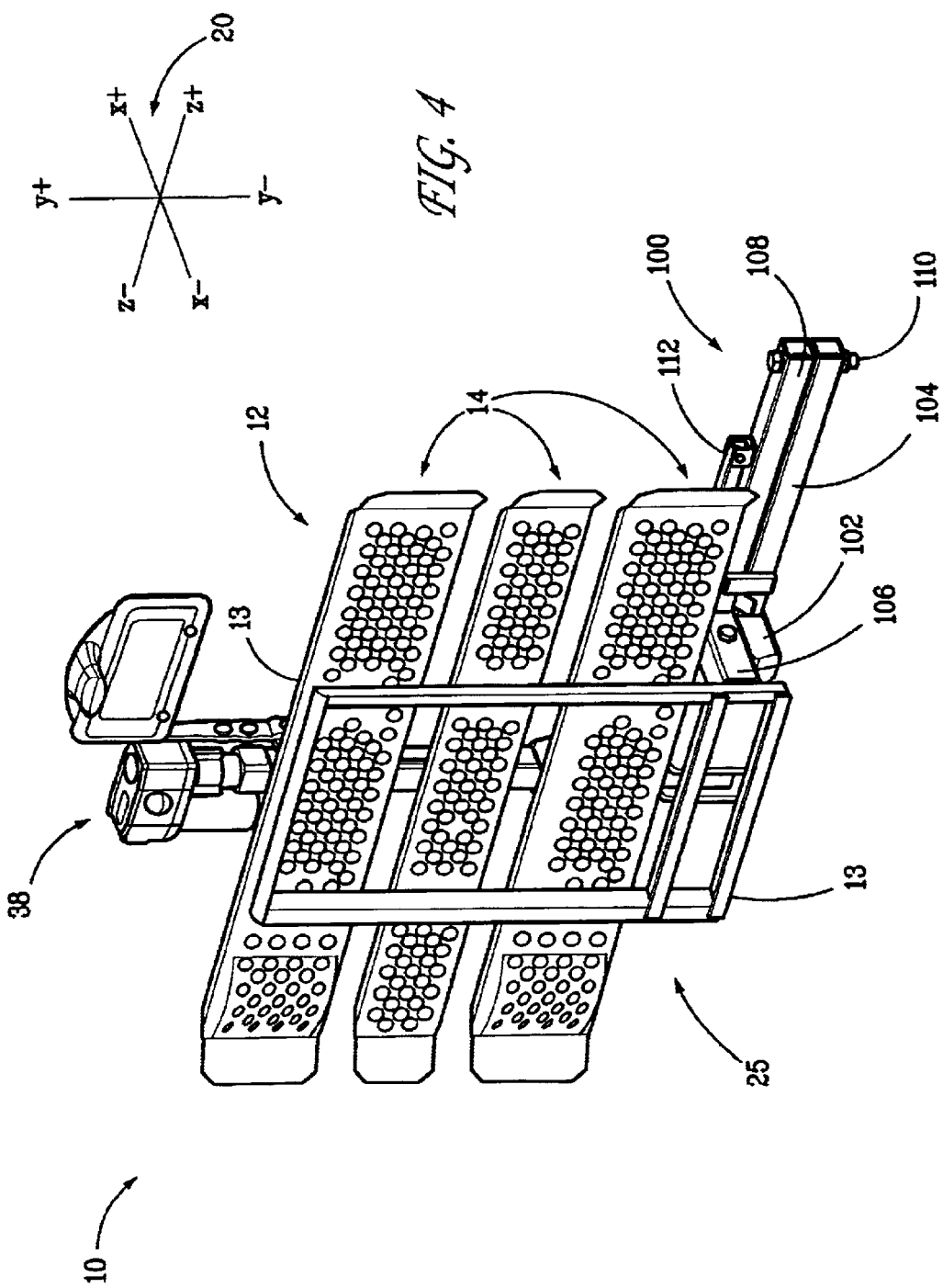

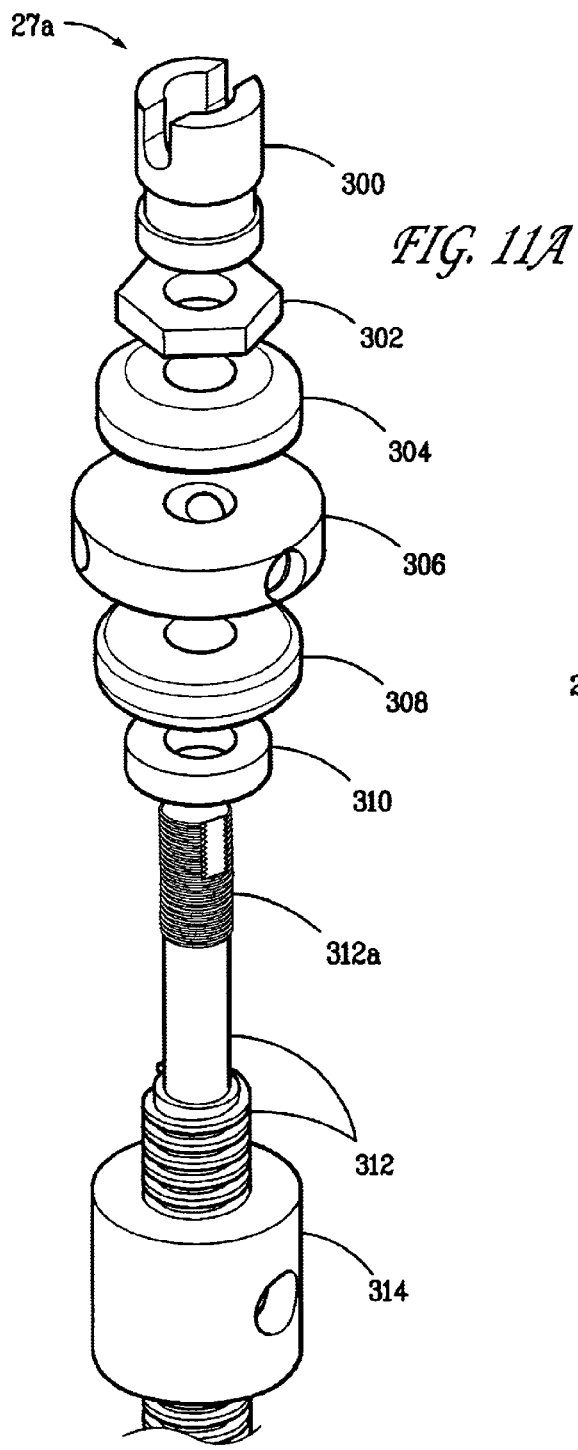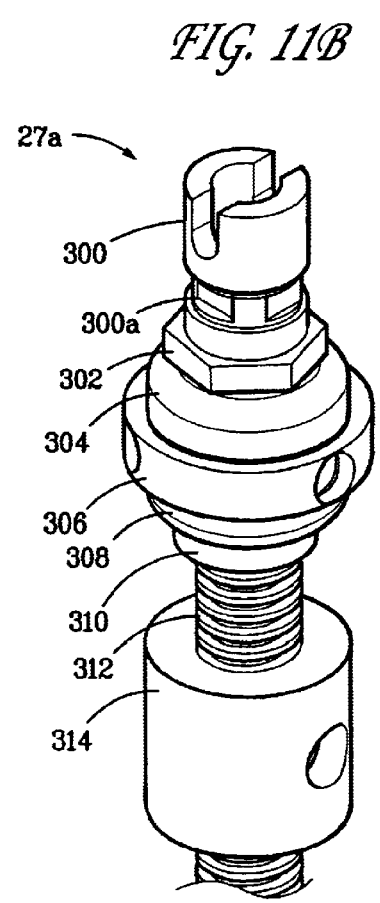
FIG. 11A
FIG. 11B

LIFT AND CARRIER ASSEMBLY FOR A PERSONAL-TRANSPORT VEHICLE

CROSS-REFERENCE TO RELATED APPLICATION

This application claims priority under 35 U.S.C. §119(e) to U.S. Provisional Patent Application Ser. No. 60/278,621, which was filed on Mar. 26, 2001 and is hereby incorporated by reference in its entirety.

FIELD OF THE INVENTION

The present invention relates the a lift and carrier assembly for a personal-transport vehicle such as a motorized scooter. The lift and carrier assembly is adapted to be mounted on a motor vehicle such as an automobile or van, and thereby facilitates transport of the personal-transport vehicle.

BACKGROUND OF THE INVENTION

Personal-transport vehicles such as motorized scooters are commonly used by persons who have ambulatory difficulties or other disabilities. Motorized scooters are generally too large to be transported inside of a motorized vehicle such as a passenger car. Furthermore, motorized scooters can weigh several hundred pounds. Thus, loading a motorized scooter onto and off of a motorized vehicle can present substantial difficulties.

Various carrier devices have been developed to facilitate the transportation of motorized scooters using passenger cars and other motorized vehicles. These devices are typically mounted on a trailer hitch or similar connecting point on the motorized vehicle. The motorized scooter rides outside of the motorized vehicle on a platform or similar-type component of the carrier device. The carrier device typically includes provisions that permit the motorized scooter to be driven onto the platform at ground level, and then lifted to prevent contact with the road surface during transport. The carrier device may include a mechanism that automatically secures the motorized scooter in place during transport.

Some carrier devices include provisions to store the platform when it is not in use. For example, the platform may be placed in a vertical position when a motorized scooter is not positioned thereon. This feature minimizes the overall dimensions of the carrier device when the carrier device is not in use.

Carrier devices that automatically move the platform into a stored position and automatically secure the motorized scooter usually rely on relatively complex mechanisms to accomplish these functions. Increases in mechanical complexity typically raise the cost, weight, and size of a carrier device, and can reduce reliability. These trends are highly undesirable, as the users of carrier devices generally demand low cost, light weight, compact dimensions, and high reliability in such devices. Furthermore, the use of an articulating platform usually decreases the overall rigidity of the carrier device. Lower rigidity decreases the ability of the carrier device to withstand the shock, vibration, acceleration, and turning forces normally encountered when the carrier device is being transported.

A need therefore exists for a carrier device for a motorized scooter or similar-type device that can raise and lower the motorized scooter, can automatically be configured in a compact manner when the motorized scooter is not positioned thereon, and can automatically secure the motorized scooter in place. A carrier device that performs these functions without the use of complex mechanisms is highly desirable. A relatively high degree of rigidity is also a desirable characteristic in such a device.

SUMMARY OF THE INVENTION

A presently-preferred embodiment of a lift and carrier assembly for a personal-transport vehicle comprises a lifting column, an actuator mechanism comprising an actuator column and a motor coupled to the actuator column and the lifting column for lifting the lifting column, a mounting column fixedly coupled to the actuator column, and a pivot plate rotatably coupled to the lifting column. The lift and carrier assembly also comprises a platform fixedly coupled to the pivot plate for supporting the personal-transport vehicle, and a cam follower coupled to the pivot plate.

The lift and carrier assembly further comprises a cam member fixedly coupled to the mounting column so that lifting of the lifting column causes the cam follower to contact the cam member thereby generating a contact force between the cam follower and the cam member. The cam follower is biased so that the contact force prevents the cam follower from being lifted when a weight acting on the platform is below a predetermined value thereby causing the pivot plate to rotate about the lifting column in response to the lifting of the lifting column, whereby the platform rotates from a substantially horizontal to a substantially vertical position when the lifting column is lifted.

Another presently-preferred embodiment of a lift and carrier assembly for a personal-transport vehicle comprises a mounting column, a lifting column, and an actuator mechanism comprising an actuator column fixedly coupled to the mounting column and a motor coupled to the actuator column and the lifting column. The actuator mechanism is adapted to lift the lifting column in relation to the mounting column. The lift and carrier assembly further comprises a first and a second pivot plate rotatably coupled to the lifting column, a platform fixedly coupled to the first and second pivot plates and being adapted to support the personal-transport vehicle, and a cam follower coupled to the first and second pivot plates by way of a slot defined in each of the first and second pivot plates.

The lift and carrier assembly also comprises a cam member fixedly coupled to the mounting column so that lifting of the lifting column when the platform is disposed in a substantially horizontal position causes the cam follower to contact the cam member. The cam follower is biased so that contact between the cam member and the cam follower restrains the cam follower from translating along a contact surface of the cam member when a weight less than a predetermined amount acts on the platform thereby causing the pivot plate to pivot substantially about the cam follower in response to the lifting of the lifting column, whereby the platform rotates from a substantially horizontal to a substantially vertical position when the lifting column is lifted.

The cam follower is also biased so that the contact between the cam member and the cam follower causes the cam follower to translate along the contact surface of the cam member when a weight approximately equal to or greater than the predetermined amount acts on the platform whereby the pivot plate remains in a substantially constant angular position in relation to the lifting column and the platform remains in the substantially horizontal position when the lifting column is lifted.

Another presently-preferred embodiment of a lift and carrier assembly for a personal-transport vehicle comprises a lifting column, a pivot plate rotatably coupled to the lifting column, a platform fixedly coupled to the pivot plate for supporting the personal-transport vehicle, and a mounting column. The lift and carrier assembly further comprises an actuator mechanism comprising an actuator column fixedly coupled to the mounting column and a motor coupled to the actuator column and the lifting column. The actuator mechanism is adapted to move the lifting column in a substantially linear direction in relation to the actuator mechanism.

The lift and carrier assembly also comprises a cam member fixedly coupled to the mounting column so that substantially linear translation of the lifting column causes the cam follower to contact the cam member. The cam member is biased toward the cam follower so that contact between the cam member and the cam follower restrains the cam follower from substantially linear translation when a weight less than a predetermined amount acts on the platform thereby causing the pivot plate and the platform to pivot substantially about the cam follower in response to the substantially linear translation of the lifting column.

BRIEF DESCRIPTION OF THE DRAWINGS

The foregoing summary, as well as the following detailed description of a presently-preferred process, is better understood when read in conjunction with the appended drawings. or the purpose of illustrating the invention, the drawings depict a connecting rod that is capable of being manufactured in accordance with the present invention. The invention is not limited, however, to use with the specific type of connecting rod disclosed in the drawings. In the drawings:

FIG. 4 is a perspective view of the lift and carrier assembly shown in FIGS. 1–3, with the platform folded and located in its upper position;

FIG. 11A is an exploded perspective view of an alternative embodiment of an actuator mechanism of the lift and carrier assembly shown in FIGS. 1–9; and FIG. 11B is a perspective view of the actuator mechanism shown in FIG. 11A, in an assembled state.

DESCRIPTION OF PREFERRED EMBODIMENTS

A presently-preferred embodiment of the invention provides a lift and carrier assembly for a personal-transport vehicle such as a motorized scooter. The invention is described with reference to a three-wheeled motorized scooter. This particular type of motorized vehicle is described for exemplary purposes only, as the invention can be used to lift and hold other types of motorized and non-motorized vehicles used for personal transport, e.g., four-wheeled scooters, wheelchairs, etc.

Figure 1:
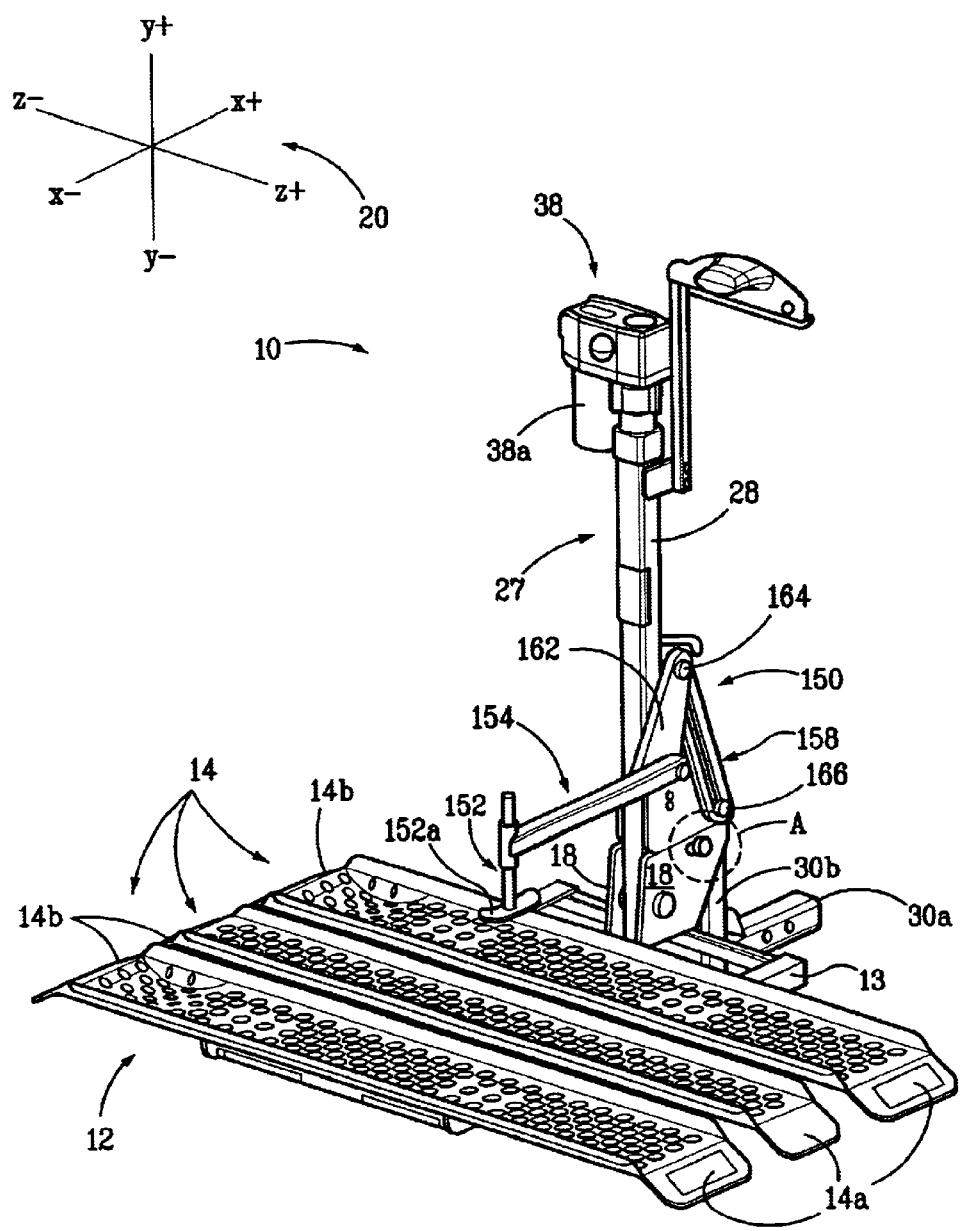
FIG. 1 is a perspective view of a presently-preferred embodiment of a lift and carrier assembly in accordance with the present invention, with a platform of the lift and carrier assembly unfolded and located in an upper position.
Figure 2:
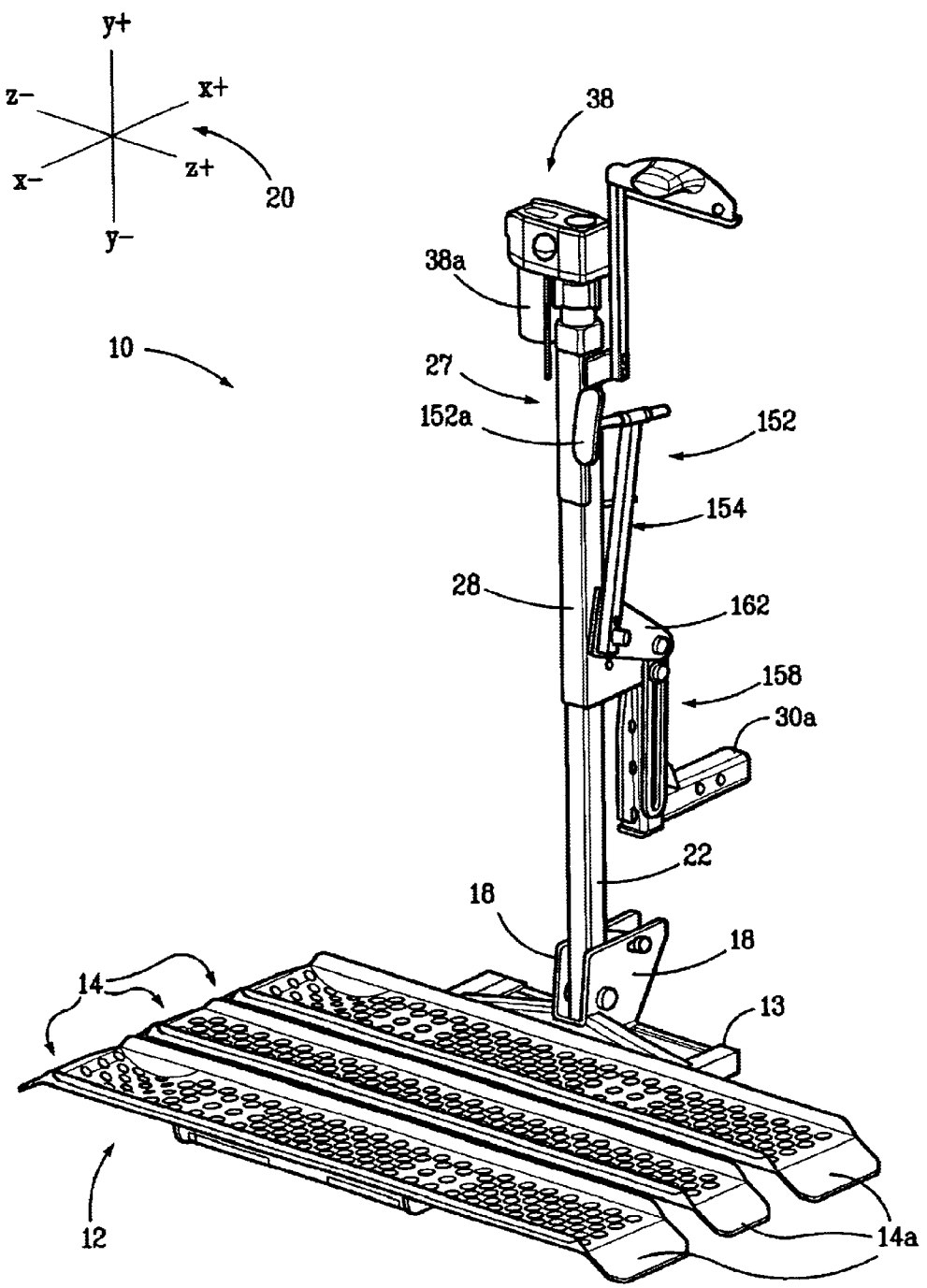
FIG. 2 is a perspective view of the lift and carrier assembly shown in FIG. 1, with the platform unfolded and located in its lower position.

FIGS. 1–9 depict a presently-preferred embodiment of a lift and carrier assembly 10 in accordance with the present invention. The lift and carrier assembly 10 comprises a platform 12. The platform 12 is capable of translating vertically, i.e., upwardly and downwardly, between a lower position (FIG. 2) and an upper position (FIG. 1). In addition, the platform 12 is adapted to rotate or swing between a horizontal (unfolded) position (FIGS. 1 and 2) and a vertical (folded) position (FIG. 4).

Note: The terms "upward" and "downward" refer respectively to the "y+" and "y−" directions denoted on a coordinate system 20 included in the figures; the terms "forward" and "rearward" refer respectively to the "x+" and "x−" direction denoted on the coordinate system 20. These terms, as well as all other directional terms appealing throughout the specification and claims, are used for illustrative purposes only and, unless otherwise noted, are not intended to limit the scope of the appended claims.

Figure 8A:
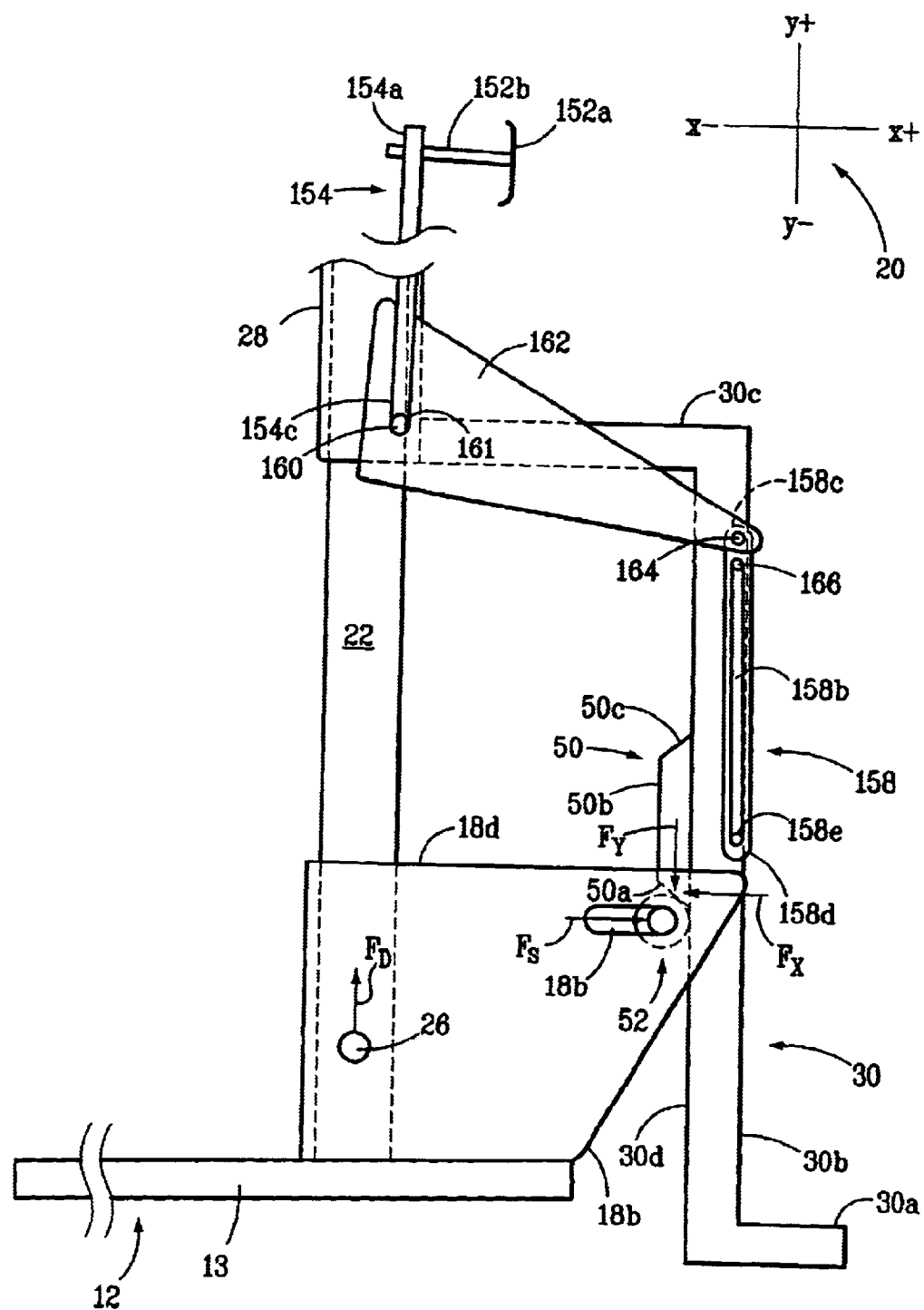
FIG. 8A is a side view of a pivot plate, a platform, and a hold-down mechanism of the lift and carrier assembly shown in FIGS. 1–5B and 7, with the platform unfolded and located proximate its lower position.
Figure 8B:
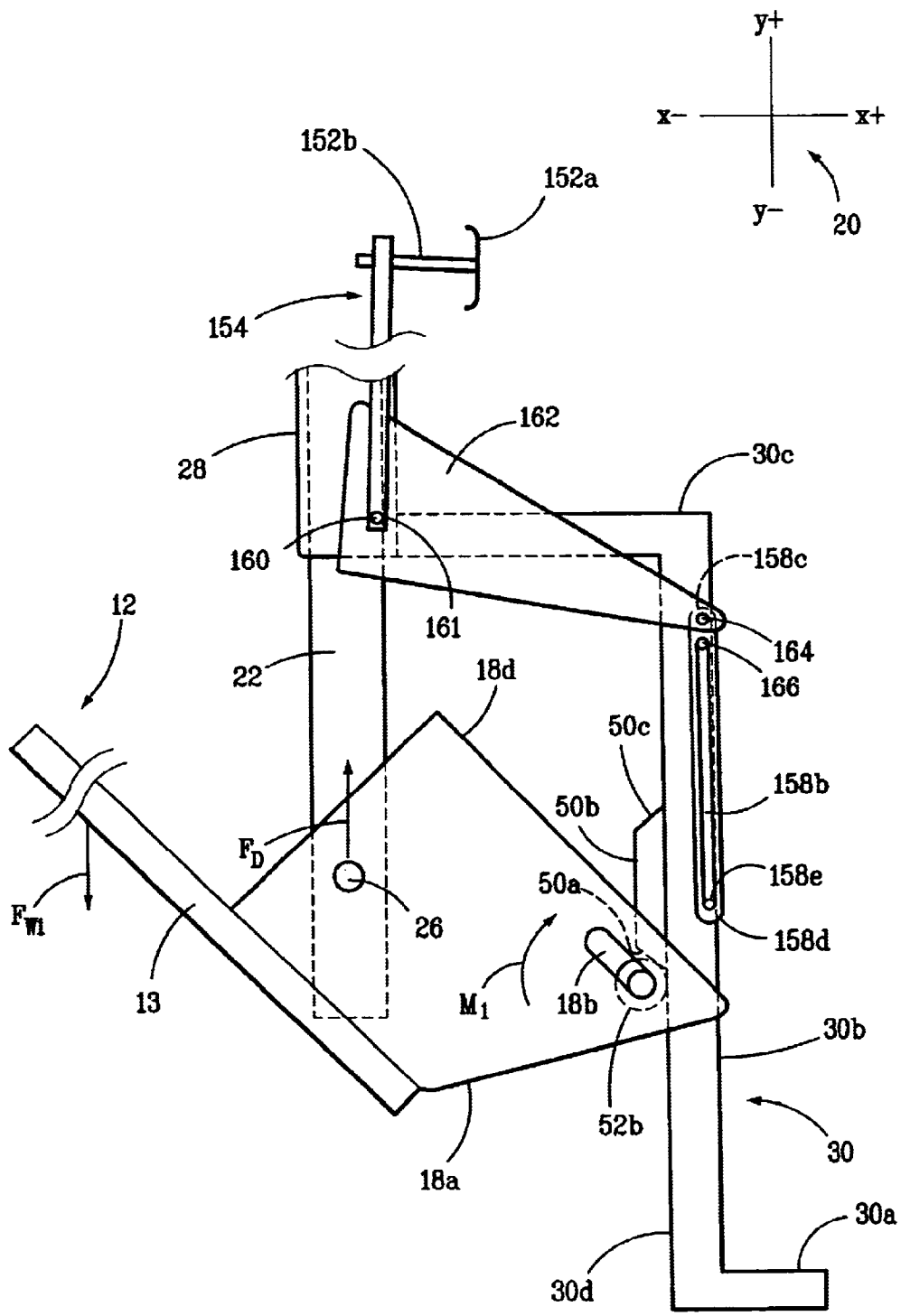
FIG. 8B is a side view of the pivot plate, platform, and hold-down mechanism shown in FIG. 8A, with the platform folding and translating upwardly.
Figure 8C:
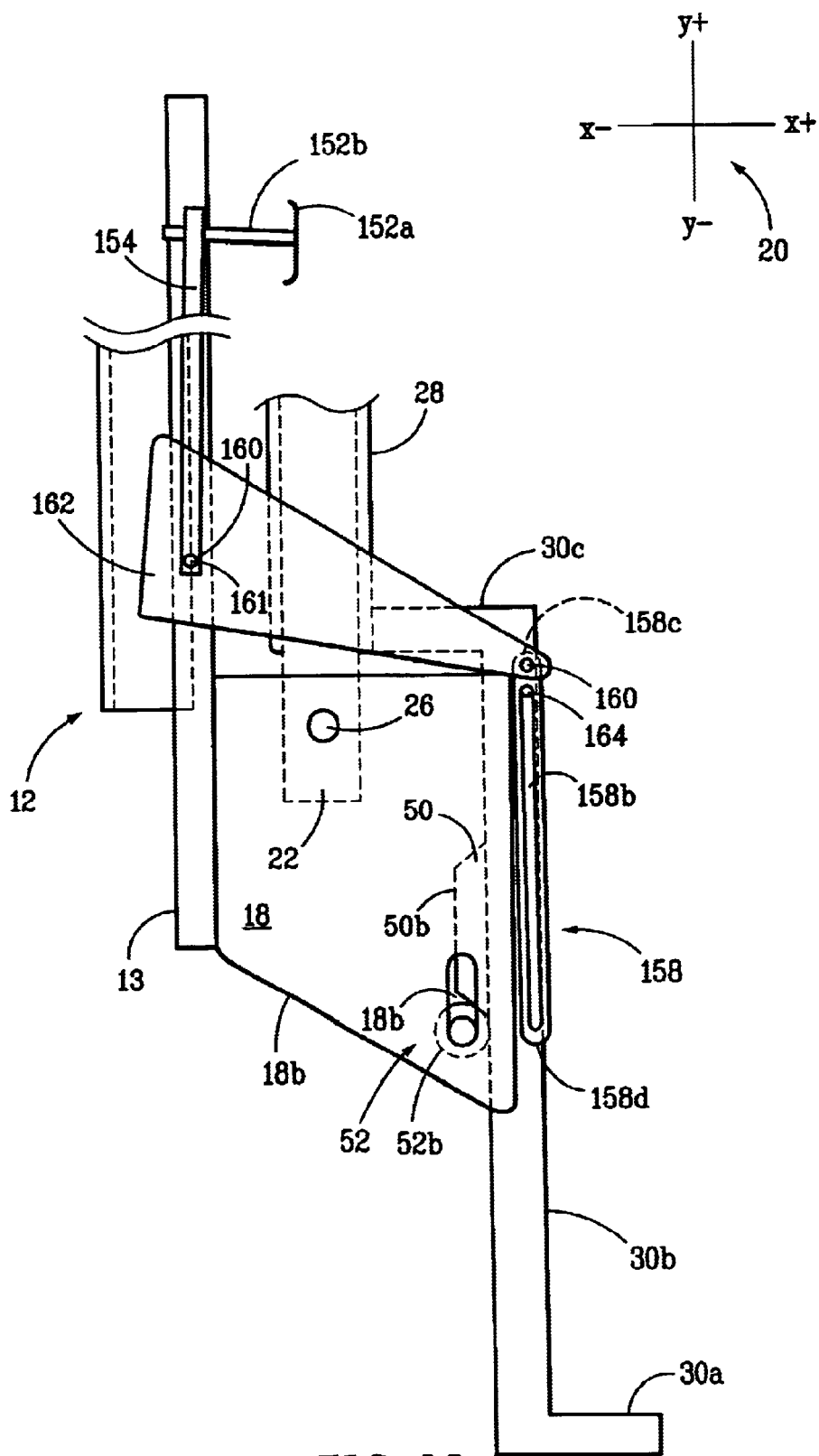
FIG. 8C is a side view of the pivot plate, platform, and hold-down mechanism shown in FIGS. 8A and 8B, with the platform folded and located proximate it upper position.
Figure 8D:
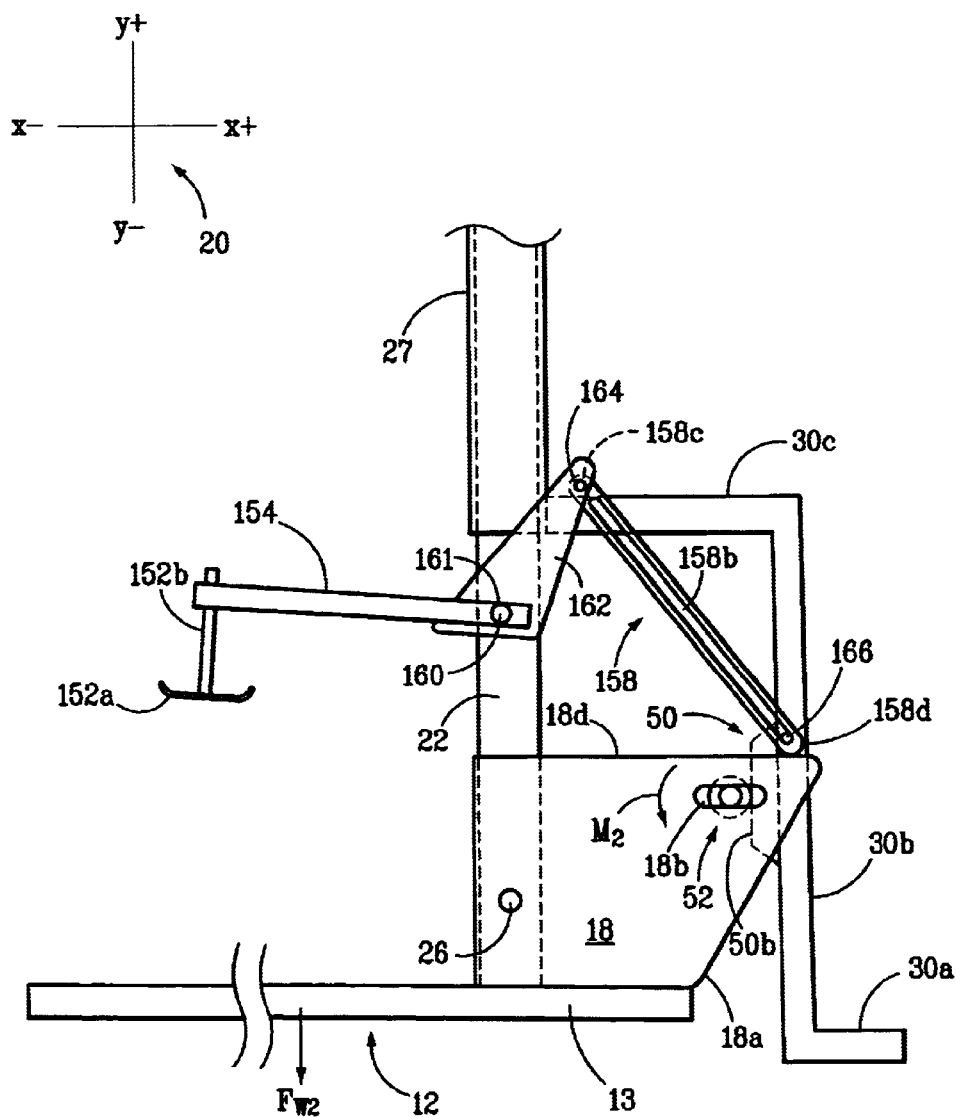
FIG. 8D is a side view of the pivot plate, platform, and hold-down mechanism shown in FIGS. 8A–8C, with the platform unfolded and translating upward.
Figure 8E:
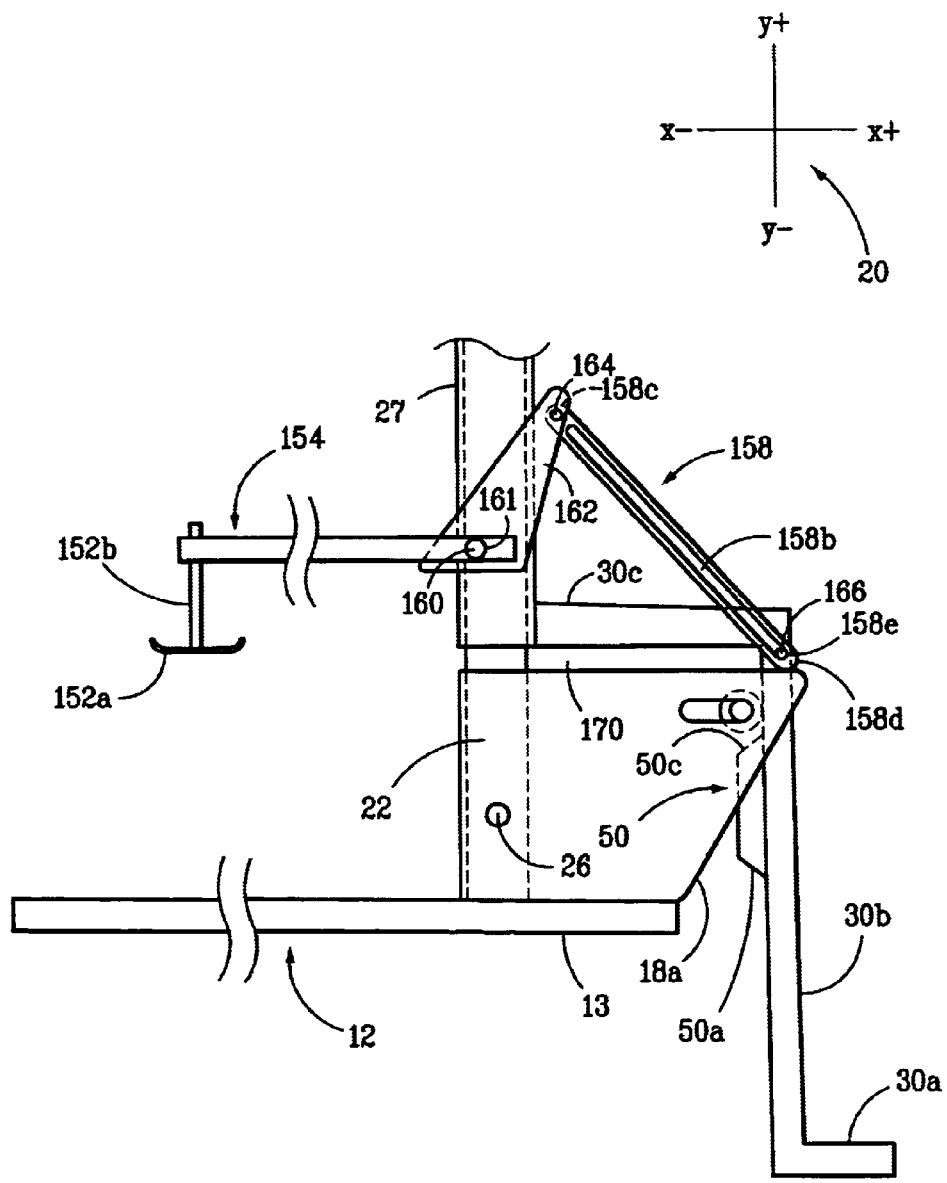
FIG. 8E is a side view of the pivot plate, platform, and hold-down shown mechanism in FIGS. 8A–8D, with the platform unfolded and located proximate its upper position.
Figure 9:
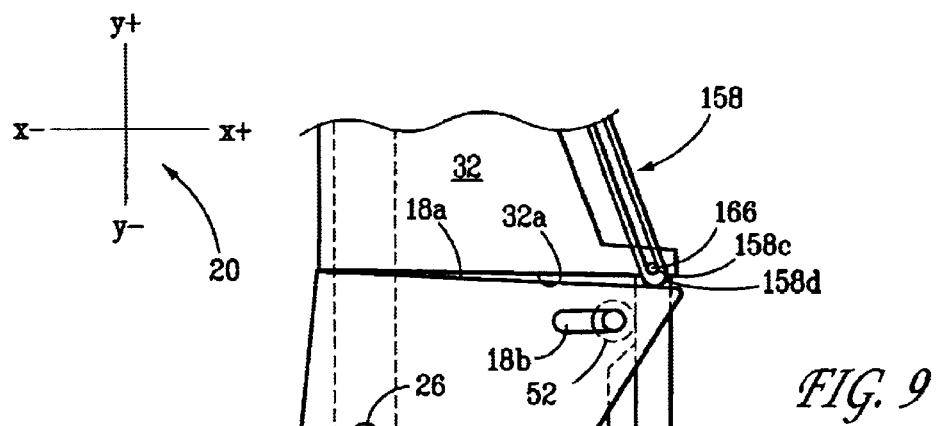
FIG. 9 is a side view of the pivot plate, platform, and hold-down mechanism shown FIGS. 8A–8E with the platform unfolded and located in its upper position.

The platform 12 includes a frame 13, and three elongate, channel-shaped tracks 14 fixedly coupled to the frame 13 (the tracks 14 are not depicted in FIGS. 8A–9, for clarity). The tracks 14 accommodate the tires of a three-wheeled motorized scooter (the motorized scooter is not depicted in the figures, for clarity). Each of the tracks 14 includes a first angled end portion 14a, and a second angled end portion 14b located at an opposite end of the track 14 from the end portion 14a. Alternative embodiments may include more or less than three tracks 14, depending on the type of vehicle being placed on the lift and carrier assembly 10.

The lift and carrier assembly 10 also comprises two pivot plates 18. The pivot plates 18 are fixedly coupled to the frame 13, and are spaced apart as shown, for example, in FIG. 1. A forward edge 18a of each pivot plate 18 is angled to extend upwardly and forwardly (see FIG. 5A).

Figure 3:
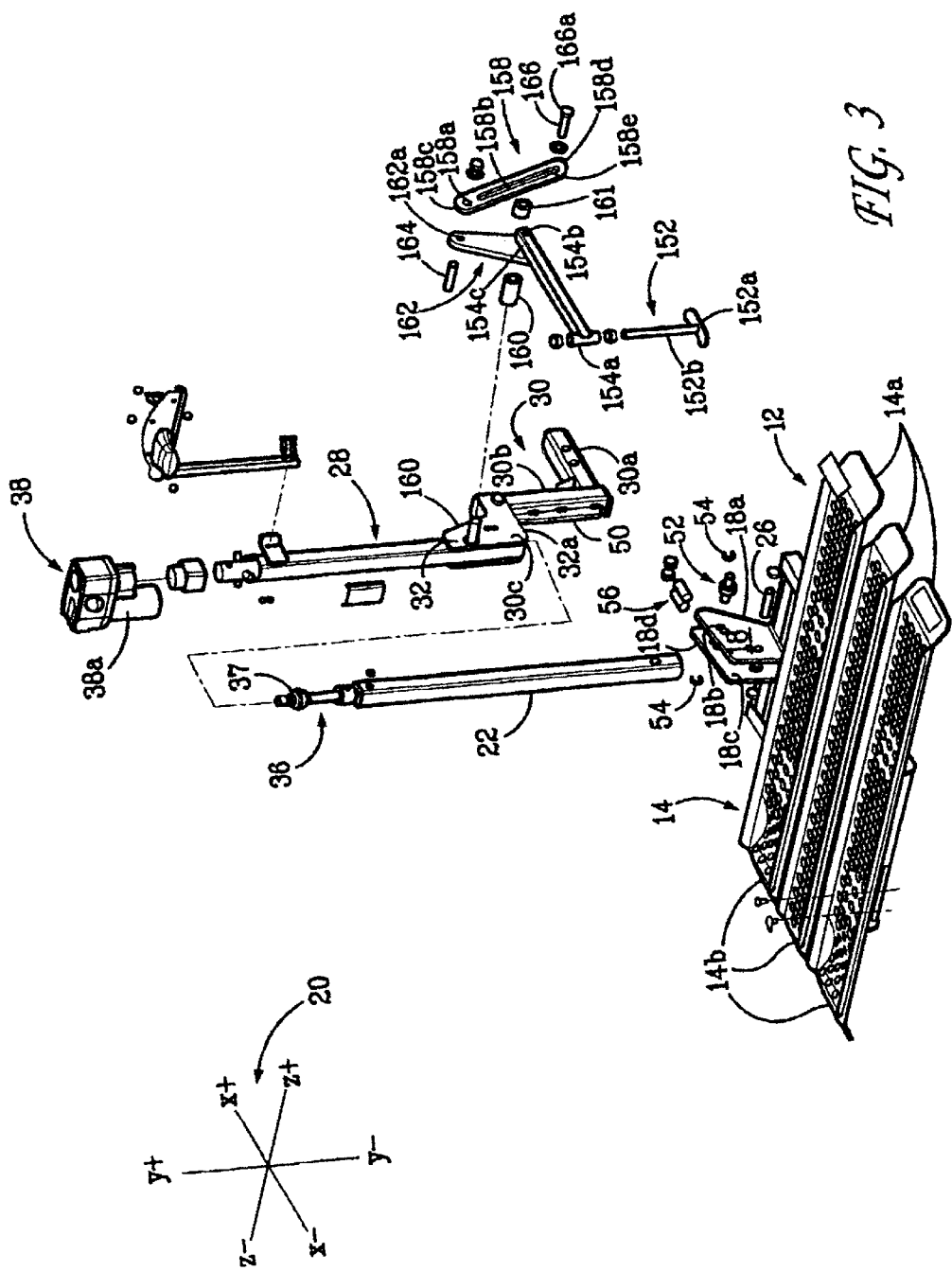
FIG. 3 is an exploded view of the lift and carrier assembly shown in FIGS. 1 and 2.

The lift and carrier assembly 10 further comprises a lifting column 22 (see FIG. 3). A lower end of the lifting column 22 is pivotally coupled to the pivot plates 18 by way of a pin 26 that extends through holes in the pivot plates 18 and the lifting column 22.

The lift and carrier assembly 10 also comprises an actuator mechanism 27 comprising an actuator column 28 and a power head 38 positioned on an upper end of the actuator column 28. The lift and carrier assembly 10 further comprises a mounting column 30 having a hitch tube 30a, a vertical tongue tube 30b, and a horizontal tongue tube 30c. The hitch tube 30a and the horizontal tongue tube 30c are fixedly coupled to opposing ends of the vertical tongue tube 30b (see FIGS. 3 and 8A–8E). The horizontal tongue tube 30c is fixedly coupled to a lower end 28a of the actuator column 28. This arrangement causes the longitudinal axes of the actuator column 28 and the vertical tongue tube 30b to be offset as shown in the figures.

Figure 5A:
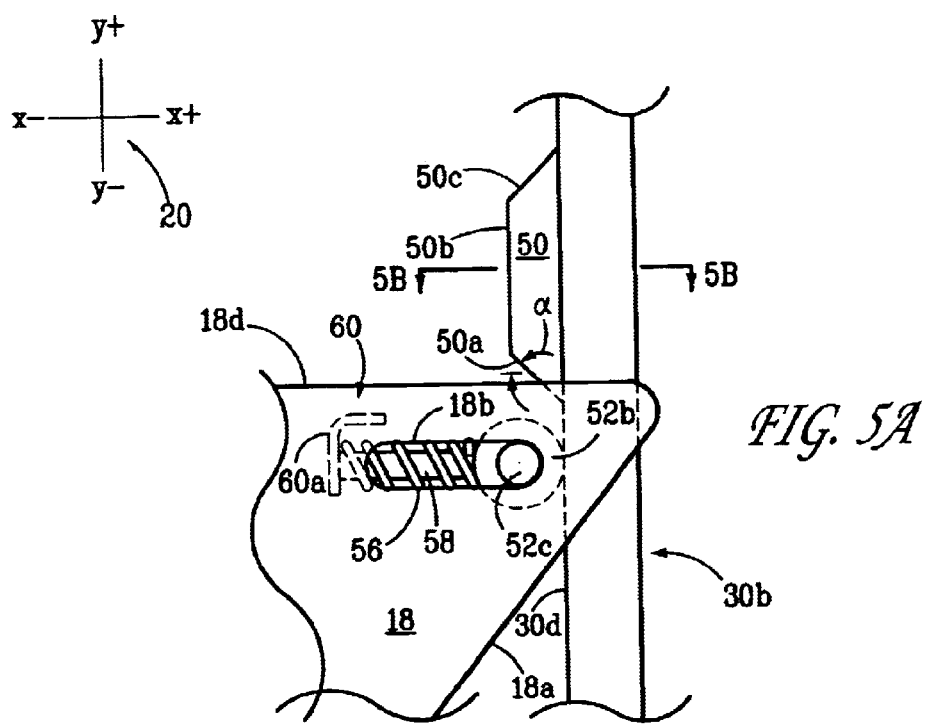
FIG. 5A is a diagrammatic side view of the area designated "A" in FIG. 1.
Figure 5B:
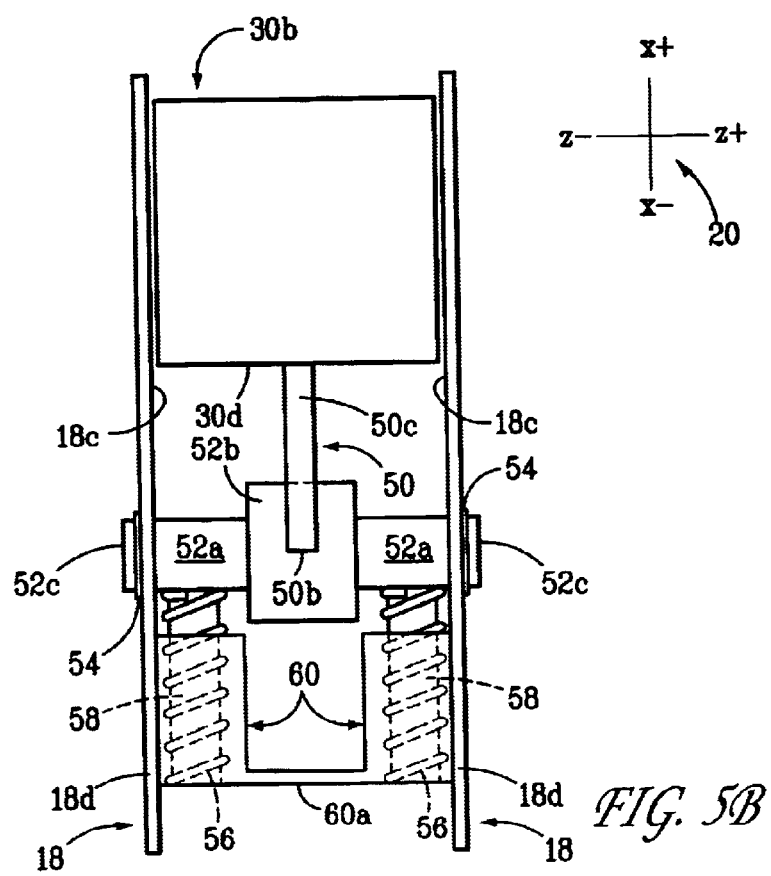
FIG. 5B is a diagrammatic view taken through the line "5B" in FIG. 5A.
Figure 6:
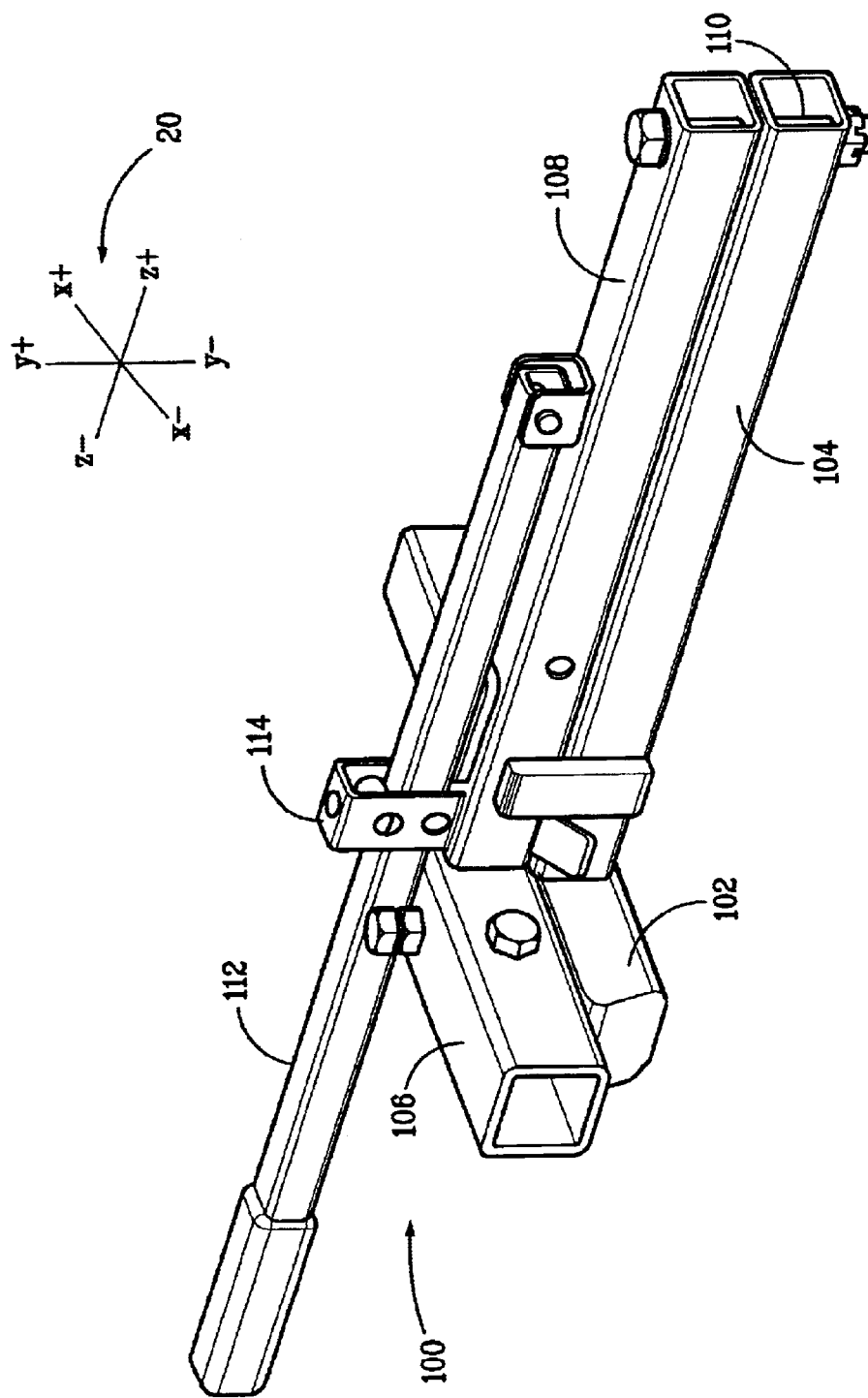
FIG. 6 is a perspective view of a swing away adapter for use with the lift and carrier assembly shown in FIGS. 1–5B.

The angled forward edges 18a of the pivot plates 18 cause a portion of each pivot plate 18 to extend forward to a position adjacent the vertical tongue tube 30b when the platform 12 is in its unfolded position (see FIG. 5A). The vertical tongue tube 30b is sized so that minimal clearance, e.g., 1/16-inch, is present between the vertical tongue tube 30b and the adjacent portions of the pivot plates 18 (FIG. 5B).

The minimal clearance between the pivot plates 18 and the vertical tongue tube 30b causes the vertical tongue tube 30b to exert a restraining effect on the pivot plates 18 (and the platform 12). More particularly, contact between the vertical tongue tube 30b and the pivot plates 18 inhibits rotation of the platform 12 about the longitudinal axis of the vertical tongue tube 30b when the lift and carrier assembly 10 is subject to the shock, vibration, acceleration, and turning forces normally encountered during transport. This feature thus increases the overall rigidity of the lift and carrier assembly 10.

Gusset plates 32 are fixedly coupled to the actuator column 28 and the vertical tongue tube 30b to provide additional rigidity to the actuator column 28 and the mounting column 30 (see FIG. 3; the gusset plates 32 are not depicted in FIGS. 8A–8E, for clarity). Each gusset plate 32 is substantially vertically aligned with a corresponding pivot plate 18 when the platform 12 is in its unfolded position. The significance of this feature is discussed below.

The lifting column 22 is telescopically mounted within the actuator column 28. The actuator mechanism 27 further comprises a drive screw 36 and a power nut 37 positioned within the lifting column 22 (see FIG. 3). The power nut 37 is threadably coupled to the drive screw 36, and is fixedly coupled to the lifting column 22. An upper end of the drive screw 36 is rotatably coupled to the power head 38. The power head 38 is adapted to selectively exert a torque on the drive screw 36, and thereby rotates the drive screw 36 in relation to the power nut 37. This rotation exerts an upward or downward force on the power nut 37. The force is transmitted to the lifting column 22, and causes the lifting column 22 to translate vertically. The upward or downward force is transmitted to the platform 12 by way of the pivot plates 18 and the pin 26, thereby causing the platform 12 to translate vertically.

The power head 38 comprises an electrically-powered motor 38a. Electrical power for the motor 38a is preferably supplied by the transporting vehicle on which the lift and carrier assembly 10 is mounted. The motor 38a is actuated by the user of the lift and carrier assembly 10 by way of switches located on the power head 38. In addition, the power head 38 preferably includes provisions to rotate the drive screw 36 by hand to accommodate situations in which electrical power for the motor 38a is unavailable.

The lift and carrier assembly 10 is adapted to be mounted on a motor vehicle such as an automobile or van to facilitate transport of the motorized scooter (the motor vehicle is hereinafter referred to as a "transporting vehicle"). The lift and carrier assembly 10 can be mounted on the transporting vehicle using a swing-away adapter 100 (see FIGS. 4, 6, and 7). The swing away adapter 100 comprises a first mounting tube 102 and a first elongate member 104 fixedly coupled to the first mounting tube 102. The swing away adapter 100 also comprises a second mounting tube 106 and a second elongate member 108 fixedly coupled to the second mounting tube 106. The second elongate member 108 is pivotally coupled to the first elongate member 104 by way of a pin 110. The first mounting tube 102 is adapted to be fixedly coupled to a trailer hitch, e.g., a class III trailer hitch, located on the transporting vehicle. The second mounting tube 106 is adapted to securely receive the hitch tube 30a of the lift and carrier assembly 10.

Figure 7:
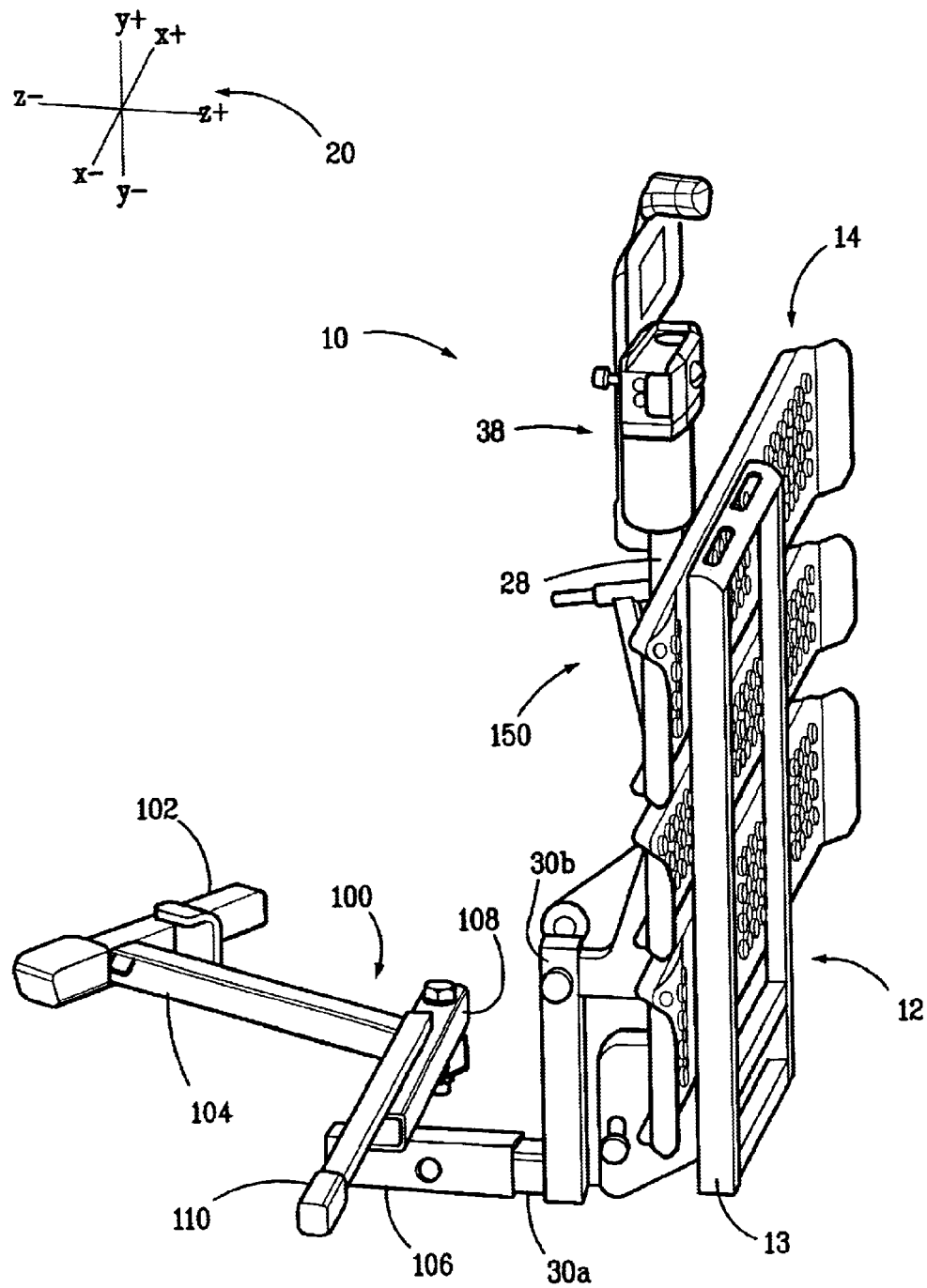
FIG. 7 is a perspective view of the lift and carrier assembly shown in FIGS. 1–5B, with the swing away adapter in its unloading position.

The swing away adapter 100 is capable of translating between a stored position (FIGS. 4 and 6) and a vehicle-loading position (FIG. 7). More particularly, the second elongate member 108 and the second mounting tube 106 are adapted to pivot about the pin 110. The pivoting motion moves the lift and carrier assembly 10 toward or away from the transporting vehicle. This feature can be used to facilitate access to the vehicle on which the swing away adapter 100 is installed.

The swing away adapter 100 includes a locking bar 112 pivotally coupled to the second elongate member 108, and a projecting member 114 that extends from an upper surface of the first mounting tube 102.

The platform 12 is capable of translating vertically between upper and lower positions, as stated previously. The lower position corresponds to ground level, and facilitates loading and unloading of the motorized scooter. More particularly, the end portions 14a of the tracks 14 contact the ground when the platform 12 is in its lower position, thereby permitting the motorized scooter to be driven onto the platform 12.

The lift and carrier assembly 10 includes features that cause the platform 12 to remain in its unfolded position when the platform 12 is raised with the motorized scooter positioned thereon. The lift and carrier assembly 10 also includes features that cause the platform 12 to automatically rotate into its folded position when the platform 12 is raised without the motorized scooter positioned thereon. A detailed description of these features follows.

The lift and carrier assembly 10 comprises a cam member 50. The cam member 50 is fixedly coupled to a rearward-facing surface 30d the vertical tongue tube 30b, and extends along the surface 30d in a substantially vertical direction (see FIGS. 3, 5A, and 5B). The cam member 50 includes a lower angled surface 50a, an elongated surface 50b, and an upper angled surface 50c. The lower angled surface 50a is preferably oriented at an angle of approximately thirty degrees in relation to the horizontal. This angle is denoted by the symbol "$\alpha$" in FIG. 5A. The elongated surface 50b has a substantially vertical orientation.

The lift and carrier assembly 10 also comprises a cam follower 52 (see FIGS. 5A and 5B). The cam follower 52 includes a shaft portion 52a and a bearing 52b rotatably disposed around the shaft portion 52a. The cam follower 52 is supported and restrained by the pivot plates 18. More particularly, each of the pivot plates 18 defines a slot 18b that extends substantially in the "x" direction (see FIGS. 3 and 5A). Opposing ends 52c of the shaft portion 52a extend through the respective slots 18b on the pivot plates 18. The cam follower 52 is restrained axially, i.e., in the "z" direction, by conventional means such as locking clips 54 positioned the ends 52c (see FIG. 5B). The slots 18b restrain the cam follower 52 from substantial vertical movement when the platform 12 is in its unfolded position. The slots 18b permit limited forward and rearward movement of the cam follower 52.

The lift and carrier assembly 10 further comprises two springs 56 that bias the cam follower 52 in a forward ("+x") direction (see FIGS. 5A and 5B; the springs 56 are not depicted in FIGS. 8A–9, for clarity). The springs 56 are each positioned around a respective spring shaft 58. The springs 56 and the spring shafts 58 are supported by a spring box 60 (see FIGS. 5A and 5B). The spring box 60 is positioned between the pivot plates 18. More particularly, opposing ends of the spring box 60 are fixedly coupled to inwardly-facing surfaces 18c of the pivot plates 18. The spring box 60 includes a downwardly-extending portion 60a. An end of each spring shaft 58 is fixedly coupled to the downwardly-extending portion 60a by, for example, welding.

An end of each spring shaft 58 is fixedly coupled to the spring box 60. An end of each spring 56 abuts the downwardly-extending portion 60a of the spring box 60, and an opposing end of each spring 56 abuts the cam follower 52. This arrangement compresses the springs 56. The springs 56 exert a reactive force that drives the shaft portion 52a of the cam follower 52 against a forward end of the slot 18b. The cam follower 52 is substantially aligned with the cam member 50 in the vertical ("y") direction when the cam follower 52 is positioned in this manner, i.e., in its forward-most position (see FIGS. 5A and 8A).

The lift and carrier assembly 10, as noted previously, includes features that cause the platform 12 to rotate or swing into its folded position when the platform 12 is raised without the motorized scooter positioned thereon. Operational details concerning these features are as follows.

The platform 12 is raised from its lower position by the above-described interaction between the drive screw 36 and the lifting column 22. Raising the platform from its lower position causes the bearing 52b of the cam follower 52 to contact the lower angled surface 50a of the cam member 50 (FIG. 8A). The angled orientation of the surface 50a, in conjunction with the upward force exerted on the cam follower 52 by the lifting column 22 (via the pivot plates 18), causes the lower angled surface 50a to exert a reactive force on the cam follower 52. This force has a rearward-acting component and a downward-acting component. The rearward and downward-acting components are denoted respectively by the symbols "$F_X$" and "$F_Y$" in FIG. 8A. These force components, if not counteracted, will cause the bearing 52b of the cam follower 52 to "ride up," i.e., translate along, the lower angled surface 50a.

The springs 56 exert a biasing force on the cam follower 52 in the forward ("x+") direction, as noted above. This force is denoted by the symbol "$F_S$" FIG. 8A. The springs 52 are chosen so that the spring rate (spring constant) of the springs 56 causes the biasing force $F_S$ to be of sufficient magnitude to prevent the cam follower 52 from riding up the lower angled surface 50a of the cam member 50. In other worlds, the springs 56 exert a forward-acting force ($F_S$) that is large enough to counteract the rearward-acting force component $F_X$ exerted by the cam member 50, when the platform 12 is raised without the motorized scooter positioned thereon. (The relationship between the force components $F_X$ and $F_Y$ is dependent upon the angle α between the lower angled surface 50a and the horizontal; thus, the required spring bias force $F_S$ is closely related to the angle α.)

The interaction between the cam member 50 and the cam follower 52 causes the platform 12 and the pivot plates 18 to rotate about the pin 26. More particularly, the weight of the platform 12 (denoted "$F_{W1}$" in FIG. 8B) and the rearward-acting force component $F_X$ exert a counterclockwise moment on the pivot plates 18, about the pin 26 (from the perspective of FIGS. 8A–8E). The downward-acting component $F_Y$ simultaneously exerts a clockwise moment about the pin 26. The spring rate of the springs 56 and the angle α of the lower angled surface 50a are selected so that the clockwise moment exceeds the counterclockwise moment when the platform 12 is raised without the motorized scooter positioned thereon. Hence, the platform 12 and the pivot plates 18 are subject to a net moment ("$M_1$") acting in a clockwise direction about the pin 26 (see FIG. 8B). This moment causes the platform 12 to rotate toward the lifting column 22 in response to the upward force ("$F_D$") applied to the pivot plates 18 by the lifting column 22.

The platform 12 continues rotating toward the lifting column 22 until the lifting column 22 reaches the end of its range of travel (see FIG. 8C). A clutching mechanism (not shown) within the power head 38 prevents the motor 38a from rotating the drive screw 36 when the lifting column 22 has reached the end of its range of travel. The platform 12 rotates through an arc of approximately ninety degrees as the lifting column 22 translates through its range of travel.

Folding the platform 12 in the above-described manner minimizes the overall dimensions of the lift and carrier assembly 10, and makes the lift and carrier assembly 10 easier to install, transport, remove, and store when the lift and carrier assembly 10 is not being used to transport the motorized scooter. The platform 12 rotates back to its horizontal (unfolded) position when the lifting column 22 is lowered, in a process that is a substantial reverse of the above-described folding process.

Details concerning operation of the lift and carrier assembly 10 when the platform 12 is raised with the motorized scooter positioned thereon are as follows. Raising the platform 12 with the motorized scooter in place causes the platform 12 to remain in its horizontal (unfolded) position, as noted previously. The platform 12 remains in its horizontal position when the motorized scooter is positioned thereon due to the additional weight of the motorized scooter.

More particularly, the combined weight (denoted "$F_{W2}$" in FIG. 8D) of the motorized scooter and the platform 12 produce a counterclockwise moment about the pin 26 that is substantially greater than the moment produced by the weight of the platform 12 by itself ($F_{W1}$). The counterclockwise moments produced by the rearward force component $F_X$ and the combined weight $F_{W2}$ of the motorized scooter and the platform 12 are counteracted by the clockwise moment produced by the downward force component $F_Y$. The spring rate of the springs 56 and the angle α of the lower angled surface 50a are selected so that the net clockwise moment (denoted "$M_2$" in FIG. 8D) equals or exceeds the counterclockwise moment when the platform 12 is raised without the motorized scooter positioned thereon. In other words, the springs 56 and the cam member 50 are configured so that the downward force component $F_Y$ is not large enough to generate a clockwise moment that exceeds the counterclockwise moments generated by the force component $F_X$ and the weight $F_{W2}$. The platform 12 thus remains in its horizontal position as the cam follower 52 contacts the lower angled surface 50 of the cam member 50 under these conditions.

The continued application of upward force on the pivot plates 18 by the lifting column 22 causes the cam follower 52 to ride up the cam member 50 (see FIG. 8D). More particularly, the bearing 52b of the cam follower 52 rotates along the lower angled surface 50a in response to the application of upward force on the shaft portion 52a of the cam follower 52 via the pivot plates 18. Relative movement between the cam follower 53 and the cam member 50 occurs because, as noted above, the moment generated by the downward force component Fy on the cam follower 52 is not large enough to overcome the counteracting moment generated by the weight of the platform 12 and the motorized scooter, and the rearward force component $F_x$. Hence, the cam member 50 does not function as a stop when the platform 12 is raised with the motorized scooter positioned thereon.

The angled orientation of the lower angled surface 50a causes the can follower to translate rearward, against the bias of the springs 56, as the cam follower 52 translates along the lower angled surface 50a. This rearward translation is facilitated by the slots 18b in the pivot plates 18 (see FIG. 8D). Continued upward movement of the platform 12 causes the cam follower 52 to translate along the elongated surface 50b and the upper angled surface 50c of the cam member 50.

The platform 12 continues its upward movement until the lifting column 22 reaches the end of its travel (see FIG. 8E), at which point the clutching mechanism within the power head 38 prevents further rotation of the drive screw. A hold-down mechanism 150, described in detail below, automatically secures the motorized scooter in place as the platform 12 reaches its upper position. The motorized scooter is ready at this point to be transported by the transporting vehicle.

The spring rate of the springs 56 in the exemplary lift and carrier assembly 10 is approximately 144 pounds per square inch. In addition, the angle α between the lower angled surface 50a of the cam member 50 and the horizontal is approximately thirty degrees, as noted previously. This particular combination of spring rate and cam-surface angle will cause the platform 12 to operate in the above-described manner. More specifically, this combination will cause the platform 12 to remain horizontal as it is raised with a weight of approximately fifty pounds or more positioned thereon. Conversely, raising the platform 12 with a weight of less than 50 pounds positioned thereon will cause the platform 12 to fold in the above-described manner.

The particular combination of spring rate and cam-surface angle α disclosed herein is provided for exemplary purposes only. Numerous variations in these values are possible, as the optimal values will vary with factors such as the dimensions and weight of the platform 12, the coefficient of friction between the cam member 50 and the cam follower 52, the relative positions of the cam follower 52 and the pin 26, etc.

The lift and carrier assembly 10 also comprises a hold-down mechanism 150 that automatically secures the motorized scooter in place when the platform 12 reaches its upper position, as noted above (see FIGS. 1–3 and 8A–8E; the hold-down mechanism is not shown in FIGS. 5A and 5B, for clarity). The hold-down mechanism 150 comprises a hold-down arm 152, an actuator arm 154, and a drive link 158.

The hold down arm 152 includes a foot portion 152a and a shaft portion 152b fixedly coupled to the foot portion 152a. The foot portion 152a is adapted to contact and restrain the motorized scooter when the motorized scooter is positioned on the platform 12. The hold-down arm 152 is fixedly coupled to a first end 154a the actuator arm 154. The shaft portion 152b is preferably secured to the actuator arm 154 in a manner that permits the position of the hold down arm 152 to be adjusted to accommodate different types of motorized scooters. (The foot member 152a may be formed as a tubular member in alternative embodiments.)

The drive link 158 has a hole 158a and a slot 158b defined therein (see FIG. 3). The hole 158a is located proximate an upper end 158c of the drive link 158 (from the perspective of FIG. 8A). The slot 158b extends between a position proximate a lower end 158d of the drive link 158, and a position proximate the hole 158a.

The actuator arm 154 is pivotally mounted on the lifting column 22. More specifically, the actuator arm 154 is pivotally coupled to a pin 160 that extends from a lower portion of the lifting column 22 and through one of the gusset plates 32. The pin 160 is accommodated by holes 154b defined in a second end 154c of the actuator arm (see FIG. 3). A rotary spring 161 is positioned around the pin 160. The spring 161 biases the actuator arm 154 in a clockwise direction (from the perspective of FIGS. 8A–8E).

A connecting plate 162 is fixedly coupled to the actuator arm 154, and extends upwardly and forwardly from the actuator arm 154 (from the perspective of FIG. 8E). A hole 162a is defined in an upper end 162a of the connecting plate 162. The drive link 158 is pivotally coupled to the connecting plate 162 by a pin 164 that extends through the holes 162a and 158a in the connecting plate 162 and the drive link 158.

The drive link 158 is slidably coupled to the vertical tongue tube 30b. More particularly, a pin 166 extends through the slot 158b, and is secured to an upper portion of the vertical tongue tube 30b. The pin 166 includes a head portion 166a that restrains the drive link 158 from lateral movement, i.e., movement in the "z" direction (see FIG. 3).

Operational details concerning the hold-down mechanism 150 are as follows. The hold-down mechanism 150 automatically assumes the position shown in FIG. 8A when the platform 12 is in lower position. More specifically, the spring 161 biases the actuator arm 154 in a clockwise direction (from the perspective of FIGS. 8A–8E), thereby rasing the hold down arm 152 up and away from the platform 12. This configuration permits the motorized scooter to be driven onto the platform 12 with no interference from the hold-down mechanism 150. In addition, the clockwise rotation of the actuator arm 154 forces the drive link 158 to the end of its range of travel. The lower end 158d of the drive link 158 is positioned proximate one of the pivot plates 18 when the drive link 158 is disposed in this manner (see FIG. 8A).

Upward translation of the platform 12 when the motorized scooter is positioned thereon causes the lower end 158d of the drive link 158 to contact an upper edge 18d of the pivot plate 18. The upper edge 18d begins to urge the drive link 158 upward as the platform 12 continues its upward translation, as shown in FIG. 8D). The upward movement of the drive link 158 causes the actuator arm 154 to rotate in a counterclockwise direction (from the perspective of FIGS. 8A–8E). More particularly, the upward movement of the upper end 158c of the drive link 158, combined with the restraining effect of the pins 160 and 164, causes the actuator arm 154 to rotate in a counterclockwise direction about the pin 160.

The upward movement of the platform 12 and the corresponding rotation of the actuator arm 154 continue until the drive link 158 reaches the end of its range of travel, i.e., until the pin 166 contacts a lower end 158e of the slot 158b (see FIG. 8E). The position of the hold down arm 152 can be adjusted at this point so that the hold down arm 152 securely engages the motorized scooter, thereby securing the motorized scooter in place on the platform 12 (this step is not necessary if the hold down arm 152 had been adjusted previously).

A gap 170 exists between the upper edge 18d of each pivot plate 18 and a corresponding lower edge 32a of a respective gusset plate 32 when the drive link 158 reaches the end of its range of travel (see FIG. 8E). The pivot plates 18 are subject at this point to the upward force exerted by the lifting column 22 via the pin 26, and a downward force exerted by the drive link 158. This combination of forces cause each pivot plate 18 to pivot in a clockwise direction about its point of contact with the drive link 158 (from the perspective of FIGS. 8A–9). The pivoting motion forces a rearward portion of each upper edge 18d into contact with a rearward portion of the lower edge 32a of the corresponding gusset plate 32, as shown in FIG. 9. The clutching mechanism within the power head 38 causes the rotation of the drive screw 36 to cease at this point.

The contact between the upper edges 18d of the pivot plates 18 and the lower edges 32a of the gusset plates 32 adds to the overall rigidity of the lift and carrier assembly 10, and thereby increases the ability of the lift and carrier assembly 10 to withstand the shock, vibration, acceleration, and turning forces normally encountered while transporting the motorized scooter. Furthermore, the pivoting motion of the platform 12 about the point of contact with the drive link 158 tilts the platform 12 slightly in the forward direction. This tilt lessens any possibility that the motorized scooter will fall off of the platform 12 due to sudden acceleration of the transporting vehicle.

The lift and carrier assembly 10 provides numerous advantages in relation to prior-art devices used to transport motorized scooters and similar-type devices. For example, the lift and carrier assembly 10 can raise and lower the platform 12 without the need for physical labor on the part of the user. In addition, the lift and carrier assembly 10 can be configured in a compact manner when the motorized scooter is not positioned thereon. The lift and carrier assembly 10 also includes provisions to secure the motorized scooter in place. These functions are performed automatically, as described in detail above. In other words, no user action is required to store the platform 12, or to secure the motorized scooter thereon, other than actuating a switch to move the platform 12 up or down. Automated operation is particularly advantageous in this particular field because many users of devices such as the lift and carrier assembly 10 have some type of ambulatory difficulty or other disability.

The lift and carrier assembly 10 performs the above-described functions using a relatively low number of moving parts. Furthermore, the kinematic relationships between the various moving parts are relatively simple. Hence, the lift and carrier assembly 10 operates without the use of substantially complex mechanisms. The lift and carrier assembly therefore has numerous advantages in relation to prior-art lift and carrier devices that rely on complex mechanical interactions for perform the above-noted functions. For example, the relatively simple construction of the lift and carrier assembly 10 has the potential to make the lift and carrier assembly 10 smaller, lighter, less expensive, and more reliable than prior-art devices of comparable capabilities.

In addition, the lift and carrier assembly 10 includes features, described in detail above, that give the lift and carrier assembly 10 a relatively high degree of rigidity. Hence, the lift and carrier assembly 10 is well suited to withstand the shock, vibration, acceleration, and turning forces normally encountered during transport.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

Figure 10:
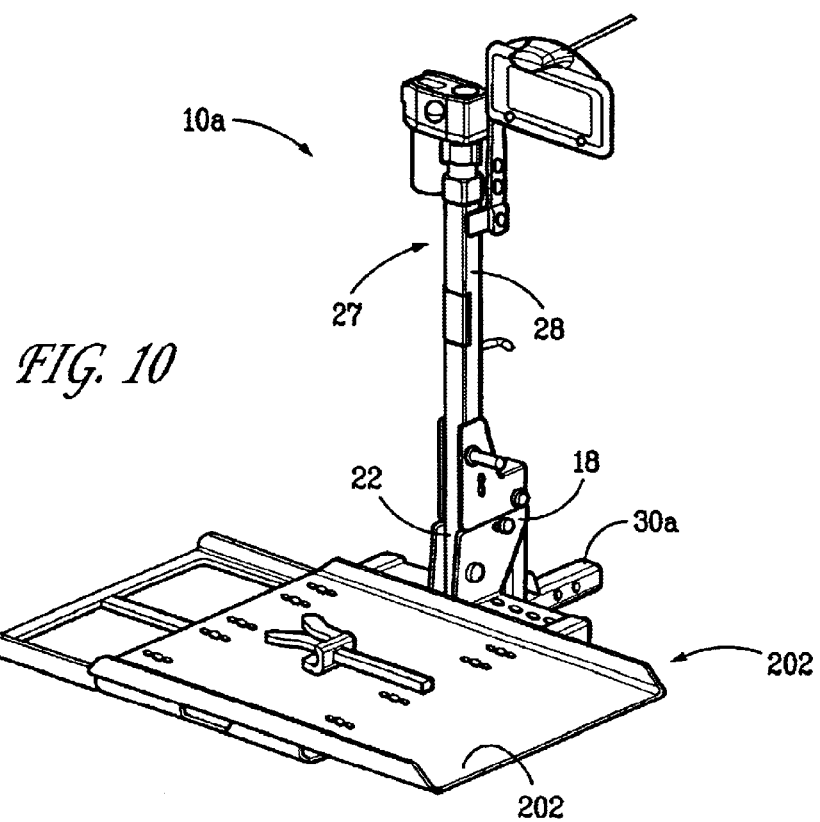
FIG. 10 is a perspective view of an alternative embodiment of the lift and carrier assembly shown in FIGS. 1–9.

For example, FIG. 10 depicts an alternative lift and carrier assembly 10a comprising a platform 202. The platform 202 includes a substantially unitary mounting surface 202a instead of the individual tracks 14. The lift and carrier assembly 10a is otherwise substantially identical to the lift and carrier assembly 10 (common reference numerals are therefore used in FIGS. 1–10 to denote substantially identical parts).

FIG. 11A and 11B depict an alternative embodiment 27a of the actuator mechanism 27. The actuator mechanism 27a comprises a coupler 300, a hex nut 302, first and second thrust bearings 304, 308, an outer flange 306, a washer 310, a drive screw 312, and a drive nut 314. The coupler 300 is fixedly coupled to the drive screw 312 by crimping (the crimped area on the coupler 300 is denoted as 300a in FIG. 11B). The crimping distorts machine threads 312a on the drive screw 312, and thereby prevents rotational movement of the coupler 300 in relation to the drive screw 312.

The drive screw 312 is subjected to momentary impact loading when the lifting column 22 reaches the end of its travel. This loading, over time, can cause a failure of the drive screw 312 at the crimping location. The hex nut 302 prevents the platform 12 from falling to the ground in the event the drive screw 312 fails. In particular, the vertical load transmitted through the drive screw 312 (including the weight of the platform 12 and any objects located thereon) is shifted to the hex nut 302 via the machine threads 312a when the drive screw 312 fails at the crimping location, thereby preventing the platform 12 from falling.

What is claimed is:

1. A lift and carrier assembly for a personal-transport vehicle, comprising:
   a lifting column;
   an actuator mechanism comprising an actuator column and a motor coupled to the actuator column and the lifting column for lifting the lifting column;
   a mounting column fixedly coupled to the actuator column;
   a pivot plate rotatably coupled to the lifting column;
   a platform fixedly coupled to the pivot plate for supporting the personal-transport vehicle;
   a cam follower coupled to the pivot plate; and
   a cam member fixedly coupled to the mounting column so that lifting of the lifting column causes the cam follower to contact the cam member thereby generating a contact force between the cam follower and the cam member, wherein the cam follower is biased so that the contact force prevents the cam follower from being lifted when a weight acting on the platform is below a predetermined value thereby causing the pivot plate to rotate about the lifting column in response to the lifting of the lifting column, whereby the platform rotates from a substantially horizontal to a substantially vertical position when the lifting column is lifted.

2. The lift and carrier assembly of claim 1, wherein the cam follower is biased so that the contact force causes the cam follower to translate along a contact surface of the cam member in response to the lifting of the lifting column when the weight acting on the platform is approximately equal to or greater than the predetermined amount, whereby the pivot plate remains in a substantially constant angular position in relation to the lifting column and the platform remains in the substantially horizontal position when the lifting column is lifted.

3. The lift and carrier assembly of claim 1, further comprising a hold-down mechanism comprising a hold-down arm, an actuator arm fixedly coupled to the hold-down arm and rotatably coupled to the actuator column, and a drive link movably coupled to the mounting column so that an end of the drive link abuts the pivot plate and the drive link is lifted by the pivot plate in response to the lifting of the lifting column when the weight acting on the platform is approximately equal to or greater than the predetermined amount, wherein the drive link is coupled to the actuator arm so that lifting of the drive link by the pivot plate causes the actuator arm to rotate toward the platform thereby causing the hold-down arm to translate toward the platform.

4. The lift and carrier assembly of claim 3, wherein the actuator mechanism is further adapted to lower the lifting column, the hold-down mechanism further comprises a spring that biases the hold-down arm away from the platform, the drive link is lowered by the pivot plate in response to lowering of the lifting column when the weight acting on the platform is approximately equal to or greater than the predetermined amount, and lowering of the drive link causes the actuator arm to rotate away from the platform in response to a bias of the spring thereby causing the hold-down arm to translate away from the platform.

5. The lift and carrier assembly of claim 4, wherein the hold-down mechanism further comprises a connecting plate fixedly coupled to the actuator arm and pivotally coupled to the drive link.

6. The lift and carrier assembly of claim 1, wherein the mounting column comprises a hitch tube, a vertical tongue tube, and a horizontal tongue tube, the hitch tube and the horizontal tongue tube being fixedly coupled to opposing ends of the vertical tongue tube, the horizontal tongue tube being fixedly coupled to a lower end of the actuator column, and the cam member being fixedly coupled to the vertical tongue tube.

7. The lift and carrier assembly of claim 6, further comprising a second of the pivot plates, wherein the pivot plates each have an angled edge that causes a portion of each of the pivot plates to extend toward and overlap opposing sides of the vertical tongue tube so that the vertical tongue tube inhibits rotational movement of the pivot plates and the platform about a longitudinal axis of the vertical tongue tube.

8. The lift and carrier assembly of claim 3, further comprising a gusset plate fixedly coupled to the mounting column and the actuator mechanism, wherein the pivot plate is restrained by the end of the drive link when the drive link is positioned at an end of a range of travel of the drive link so that the pivot plate pivots about the drive link and into the gusset plate in response to the lifting of the lifting column.

9. The lift and carrier assembly of claim 1, further comprising a first and a second spring coupled to the pivot plate and the cam follower and biasing the cam follower.

10. The lift and carrier assembly of claim 9, wherein the first and the second springs each have a spring constant of approximately 144 pounds per square inch.

11. The lift and carrier assembly of claim 1, wherein the platform comprises a frame and a track fixedly coupled to the frame.

12. The lift and carrier assembly of claim 1, wherein the lifting column is telescopically mounted within the actuator column.

13. The lift and carrier assembly of claim 12, wherein the actuator mechanism further comprises a drive screw, a power head positioned on an end of the actuator column and being adapted to rotate the drive screw, and a power nut 37 threadably coupled to the drive screw and fixedly coupled to the lifting column so that rotation of the drive screw causes the actuator column to translate in a substantially vertical direction.

14. The lift and carrier assembly of claim 1, wherein the lifting of the lifting column causes the cam follower to contact a lower angled surface of the cam member, the lower angled surface being oriented at an angle of approximately 30 degrees in relation to the horizontal.

15. The lift and carrier assembly of claim 1, wherein the cam member has a lower angled surface, an elongated surface adjoining the lower angled surface, and an upper angled surface adjoining the lower angled surface.

16. The lift and carrier assembly of claim 2, further comprising a second of the pivot plates, wherein the pivot plates each have a slot defined therein and end portions of the cam follower are positioned within the slots so that the cam follower is capable of translating away from the cam member in response to the lifting of the lifting column.

17. The lift and carrier assembly of claim 1, wherein the cam follower comprises a shaft portion and a bearing rotatably disposed around the shaft portion.

18. The lift and carrier assembly of claim 6, further comprising a swing-away adapter comprising a first mounting tube adapted to be coupled to a trailer hitch, a first elongate member fixedly coupled to the first mounting tube, a second mounting tube being adapted to securely receive the hitch tube, and a second elongate member fixedly coupled to the second mounting tube and pivotally coupled to the first elongate member, wherein the swing-away adapter is adapted to translate between a stored position and a vehicle-loading position, and the second elongate member substantially overlaps the first elongate member and the second mounting tube substantially overlaps the first mounting tube when the -away adapter is in its stored position.

19. A lift and carrier assembly for a personal-transport vehicle, comprising:
a mounting column;
a lifting column;
an actuator mechanism comprising an actuator column fixedly coupled to the mounting column and a motor coupled to the actuator column and the lifting column, the actuator mechanism being adapted to lift the lifting column in relation to the mounting column;
a first and a second pivot plate rotatably coupled to the lifting column;
a platform fixedly coupled to the first and second pivot plates and being adapted to support the personal-transport vehicle;
a cam follower coupled to the first and second pivot plates by way of a slot defined in each of the first and second pivot plates; and
a cam member fixedly coupled to the mounting column so that lifting of the lifting column when the platform is disposed in a substantially horizontal position causes the cam follower to contact the cam member, wherein:

the cam follower is biased so that contact between the cam member and the cam follower restrains the cam follower from translating along a contact surface of the cam member when a weight less than a predetermined amount acts on the platform thereby causing the pivot plate to pivot substantially about the cam follower in response to the lifting of the lifting column, whereby the platform rotates from a substantially horizontal to a substantially vertical position when the lifting column is lifted; and the cam follower is biased so that the contact between the cam member and the cam follower causes the cam follower to translate along the contact surface of the cam member when a weight approximately equal to or greater than the predetermined amount acts on the platform whereby the pivot plate remains in a substantially constant angular position in relation to the lifting column and the platform remains in the substantially horizontal position when the lifting column is lifted.

20. The lift and carrier assembly of claim 19, further comprising a hold-down mechanism comprising a hold-down arm, an actuator arm fixedly coupled to the hold-down arm and rotatably coupled to the actuator column, and a drive link movably coupled to the mounting column so that an end of the drive link abuts the pivot plate and the drive link is lifted by the pivot plate in response to the lifting of the lifting column when the weight acting on the platform is approximately equal to or greater than the predetermined amount, wherein the drive link is coupled to the actuator arm so that lifting of the drive link by the pivot plate causes the actuator arm to rotate toward the platform thereby causing the hold-down arm to translate toward the platform.

21. The lift and carrier assembly of claim 20, wherein the actuator mechanism is further adapted to lower the lifting column in relation to the mounting column, the hold-down mechanism further comprises a spring that biases the hold-down arm away from the platform, the drive link is lowered by the pivot plate in response to lowering of the lifting column when the weight acting on the platform is approximately equal to or greater than the predetermined amount, and lowering of the drive link causes the actuator arm to rotate away from the platform in response to a bias of the spring thereby causing the hold-down arm to translate away from the platform.

22. The lift and carrier assembly of claim 21, wherein the hold-down mechanism further comprises a connecting plate fixedly coupled to the actuator arm and pivotally coupled to the drive link.

23. The lift and carrier assembly of claim 19, wherein the mounting column comprises a hitch tube, a vertical tongue tube, and a horizontal tongue tube, wherein the hitch tube and the horizontal tongue tube are fixedly coupled to opposing ends of the vertical tongue tube, the horizontal tongue tube is fixedly coupled to a lower end of the actuator column, and the cam member is fixedly coupled to the vertical tongue tube.

24. The lift and carrier assembly of claim 23, wherein the first and second pivot plates each have an angled edge that causes a portion of each of the pivot plates to extend toward and overlap opposing sides of the vertical tongue tube so that the vertical tongue tube inhibits rotational movement of the pivot plates and the platform about a longitudinal axis of the vertical tongue tube.

25. The lift and carrier assembly of claim 19, further comprising a gusset plate fixedly coupled to the mounting column and the actuator mechanism, wherein the pivot plate is restrained by the end of the drive link when the drive link is positioned at an end of a range of travel of the drive link so that the pivot plate pivots about the drive link and into the gusset plate in response to the lifting of the lifting column.

26. The lift and carrier assembly of claim 19, further comprising a first and a second spring coupled to the pivot plate and the cam follower and biasing the cam follower, the first and the second springs each having a spring constant of approximately 144 pounds per square inch.

27. The lift and carrier assembly of claim 19, wherein the actuator mechanism is further adapted to lower the lifting column in relation to the mounting column.

28. The lift and carrier assembly of claim 19, wherein the lifting column is telescopically mounted within the actuator column.

29. The lift and carrier assembly of claim 19, wherein the lifting of the lifting column causes the cam follower to contact a lower angled surface of the cam member, the lower angled surface being oriented at an angle of approximately 30 degrees in relation to the horizontal.

30. A lift and carrier assembly for a personal-transport vehicle, comprising:

a lifting column;

a pivot plate rotatably coupled to the lifting column;

a platform fixedly coupled to the pivot plate for supporting the personal-transport vehicle;

a mounting column;

an actuator mechanism comprising an actuator column fixedly coupled to the mounting column and a motor coupled to the actuator column and the lifting column, the actuator mechanism being adapted to move the lifting column in a substantially linear direction in relation to the actuator mechanism;

a cam follower coupled to the pivot plate; and a cam member fixedly coupled to the mounting column so that substantially linear translation of the lifting column causes the cam follower to contact the cam member, wherein the cam member is biased toward the cam follower so that contact between the cam member and the cam follower restrains the cam follower from substantially linear translation when a weight less than a predetermined amount acts on the platform thereby causing the pivot plate and the platform to pivot substantially about the cam follower in response to the substantially linear translation of the lifting column.

31. The lift and carrier assembly of claim 30, wherein the cam follower is biased so that the contact force causes the cam follower to translate along a contact surface of the cam member in response to the substantially linear translation of the lifting column when the weight less than the predetermined amount acts on the platform, thereby causing the pivot plate and the platform to remain in a substantially constant angular position in relation to the lifting column in response to the substantially linear translation of the lifting column.

32. The lift and carrier assembly of claim 31, further comprising a hold-down mechanism comprising a hold-down arm, an actuator arm fixedly coupled to the hold-down arm and rotatably coupled to the actuator column, and a drive link movably coupled to the mounting column so that an end of the drive link abuts the pivot plate and the drive link is lifted by the pivot plate in response to the substantially linear translation of the lifting column when the weight acting on the platform is approximately equal to or greater than the predetermined amount, wherein the drive link is coupled to the actuator arm so that lifting of the drive link by the pivot plate causes the actuator arm to rotate thereby causing the hold-down arm to translate toward the platform.

33. The lift and carrier assembly of claim 31, wherein the mounting column comprises a hitch tube, a vertical tongue tube, and a horizontal tongue tube, wherein the hitch tube and the horizontal tongue tube are fixedly coupled to opposing ends of the vertical tongue tube, the horizontal tongue tube is fixedly coupled to a lower end of the actuator column, and the cam member is fixedly coupled to the vertical tongue tube.

34. The lift and carrier assembly of claim 33, further comprising a second of the pivot plates, wherein the pivot plates each have an angled edge that causes a portion of each of the pivot plates to extend toward and overlap opposing sides of the vertical tongue tube so that the vertical tongue tube inhibits rotational movement of the pivot plates and the platform about a longitudinal axis of the vertical tongue tube.

35. The lift and carrier assembly of claim 30, further comprising a gusset plate fixedly coupled to the mounting column and the actuator mechanism, wherein the pivot plate is restrained by the end of the drive link when the drive link is positioned at an end of a range of travel of the drive link so that the pivot plate pivots about the drive link and into the gusset plate in response to the substantially linear translation of the lifting column.

36. The lift and carrier assembly of claim 30, further comprising a second of the pivot plates, wherein the pivot plates each have a slot defined therein and end portions of the cam follower are positioned within the slots so that the cam follower is capable of translating away from the cam member in response to the substantially linear translation of the lifting column.

37. The lift and carrier assembly of claim 30, wherein the pivot plate and the platform pivot through an arc of approximately ninety degrees in response to the substantially linear translation of the lifting column.

38. A lift and carrier assembly for a personal-transport vehicle, comprising:

a mounting column;

a lifting column;

means for lifting the lifting column in relation to the mounting column;

a first and a second pivot plate rotatably coupled to the lifting column;

a platform fixedly coupled to the first and second pivot plates and being adapted to support the personal-transport vehicle; and cam means mechanically coupled to the mounting column and cam follower means mechanically coupled to the first and second pivot plates for (i) rotating the platform from a substantially horizontal to a substantially vertical position when the lifting column is lifted and a weight less than a predetermined amount acts on the platform and (ii) causing the platform to remain in the substantially horizontal position when the lifting column is lifted and a weight greater than the predetermined amount acts on the platform.

\* \* \* \* \*